W. ACHTMEYER.
WEB FASTENER.
APPLICATION FILED JULY 13, 1916.
1,225,555.
Patented May 8, 1917.
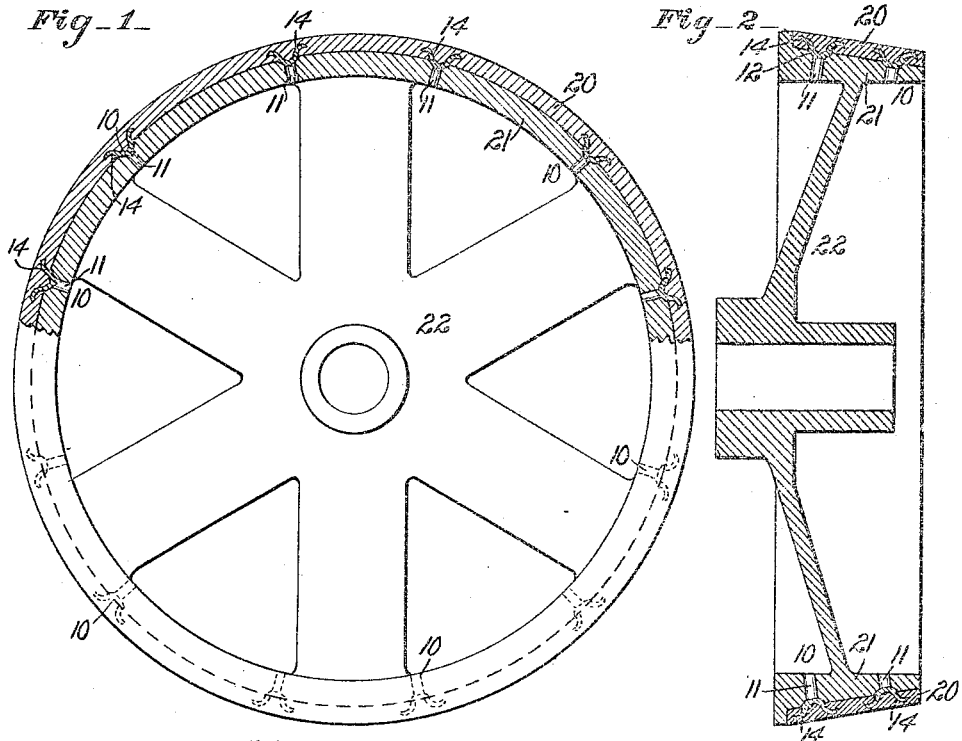
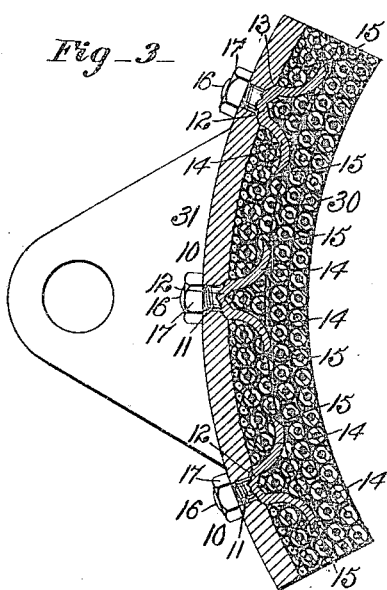
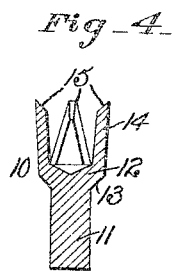
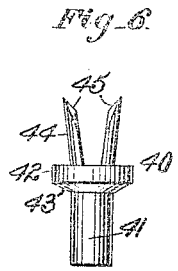
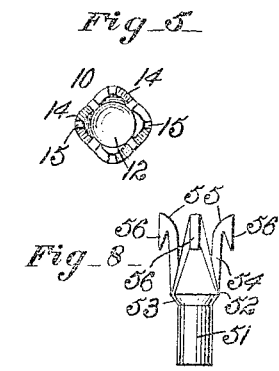
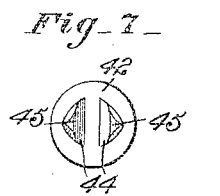
WITNESSES
Frank C. Palmer
Rudy G. Hoster
INVENTOR
W. Achtmeyer
BY Mumm Co.
ATTORNEYS

UNITED STATES PATENT OFFICE.

WILLIAM ACHTMEYER, OF MIDDLETOWN, CONNECTICUT.

WEB-FASTENER.

1,225,555.   Specification of Letters Patent.   Patented May 8, 1917.

Application filed July 13, 1916.   Serial No. 109,051.

*To all whom it may concern:*

Be it known that I, WILLIAM ACHTMEYER, a subject of the German Emperor, and a resident of Middletown, in the county of Middlesex and State of Connecticut, have invented a new and Improved Web-Fastener, of which the following is a full, clear, and exact description.

The object of the invention is to provide a new and improved web fastener more especially designed for fastening web brake shoes to brake shoe heads, or web linings to cone clutches, and arranged to securely hold the web in place and without any portion of the fastener projecting onto the wearing or contacting face of the brake shoe or lining.

In order to produce the desired result, use is made of a metallic fastener having a shank, a head at one end of the shank, and a plurality of prongs extending integrally from the head and slightly bent outward, the said prongs being adapted to be driven into the under side of the web to cause the prongs to spread intermediate the under side and the wearing face of the web.

A practical embodiment of the invention is represented in the accompanying drawings forming a part of this specification, in which similar characters of reference indicate corresponding parts in all the views.

Figure 1 is a face view of a cone clutch and its lining, the latter being fastened in place on the rim of the clutch by the improved fastener, parts being shown in section;

Fig. 2 is a transverse section of the same;

Fig. 3 is a sectional side elevation of the fastener as applied for fastening a brake shoe to a brake shoe head;

Fig. 4 is an enlarged sectional side elevation of the fastener;

Fig. 5 is a plan view of the same;

Fig. 6 is a side elevation of a modified form of the fastener;

Fig. 7 is a plan view of the same; and

Fig. 8 is a side elevation of another modified form of the fastener.

The fastener 10 illustrated in Figs. 1, 2, 3, 4 and 5 is made of metal and consists of a shank 11 terminating at one end in a head 12 having a beveled under side or base 13, and from the top of the head 12 extend integrally prongs 14 slightly bent outwardly and provided at their outer ends with bevels 15 extending from the inner face of a prong upwardly and outwardly to the outer face of a prong so that each prong terminates in a point. The fastener 10, as shown in Figs. 1 and 2, is used for fastening a multi-ply web 20 to the peripheral conical face of a rim 21 of a cone clutch 22. In this case, the shank 11 of each fastener engages a radial aperture in the rim 21 and this aperture is countersunk for receiving the beveled base 13 of the head 12. The lining 20 is shrunk in position on the rim 21 in the manner more fully shown and described in the Letters Patent of the United States, No. 1,210,131, granted to me on December 26, 1916. The lining 20 consists essentially of a webbing made of two interwoven plies or layers, of which one is the under layer and is adapted to fit onto the peripheral face of the rim 21. The under layer is woven in such a manner that it is gradually denser in texture in a direction transverse to the length of the webbing. The upper or wearing layer of the webbing is of a uniform texture throughout and its warp threads are approximately the same in number to the inch as the warp threads of the densest portion of the under layer. The webbing is shrunk on the rim 21 by immersing in a shrinking solution which latter impregnates the webbing and makes it more compact. The prongs 14 are forced into the web 20 by suitable pressure devices and in doing so the prongs 14 spread intermediate the under side of the lining 20 and the wearing face thereof so that no portion of the fastener extends on the wearing face of the lining. It is understood that this spreading of the prongs 14 is due to the temporary compacting of the fabric material between the outwardly bent prongs 14 and the head 12 by the action of the pressure devices and the spreading of the prongs 14 is further facilitated by the beveled outer ends of the prongs 14. It will further be noticed that the fabric material when subjected to pressure by the pressure devices passes into the space between the prongs and as this space is gradually reduced in size from the outer ends of the prongs 14 to the head 12 it is evident that the entering fabric material is compressed and thus exerts an outward pressure against the prongs and bends and spreads the same. The upper or wearing layer of the webbing owing to its uniform texture and greater density than that of the under layer aids in the spreading of the prongs by offering more resistance than the under layer and hence the points of the prongs 14 do not pierce the outer layer of the webbing and do not appear on the outer face of the webbing.

When using the fasteners 10 for fastening a brake shoe 30 to the brake shoe head 31 then the shank 11 extends through an aperture in the brake shoe head and the outer portion 16 of the shank is preferably threaded for the reception of a nut 17 screwing against the outer face of the brake shoe head 31 to securely hold the fastener in position on the brake shoe head. The brake shoe 30 is pressed against the prongs 14 and in doing so the prongs are spread, the same as above described in reference to the lining 20.

It is understood that in either of the cases mentioned the heads 12 of the fasteners are seated on the rim 21 or the brake shoe head 31 so that when pressure is applied the prongs readily pass into the web to be spread therein intermediate the under side and the wearing face of the web.

As shown in Figs. 4 and 5, four prongs 14 are used on the head 12, but I do not limit myself to this particular number as less or more prongs may be used: for instance, as shown in Figs. 6 and 7, the fastener 40 is provided with a shank 41 having a head 42 provided with a beveled base 43 and having two prongs 44 extending from the top of the head. The outer ends of the prongs 44 are provided with bevels 45, the same as the bevels 15 above mentioned.

The fastener shown in Fig. 8 consists of a shank 51, a head 52 having a beveled base 53 and having upwardly extending prongs 54 provided with bevels 55 and with barbs 56 which readily embed themselves in the web on spreading the prongs whenever pressure is applied as above described.

Having thus described my invention, I claim as new and desire to secure by Letters Patent:—

1. In combination, a multiply web having an under layer and a wearing layer of greater density than the under layer, a support on which rests the said under layer, the support having an aperture, and a fastener provided with a shank, a head and prongs, the said shank engaging the said aperture, the said head being integral with one end of the said shank and being seated on the said support adjacent the said under layer, and the said prongs extending integrally from the top marginal portion of the head and being driven into the said web, the said prongs prior to being driven into the web being bent slightly outwardly to cause the material of the under layer to compact between the prongs and the head and thereby spread the prongs intermediate the outer and inner faces of the web.

2. In combination, a multiply web, a support on which rests the said web, the support having a countersunk aperture, and a fastener attaching the said web to the said support, the fastener having a shank, a head and prongs, the said shank engaging the aperture, the said head being integral with one end of the shank and having its under side beveled and seated in the countersink of the said aperture, and the said prongs extending integrally from the top marginal portion of the said head and being driven into the said web, the said prongs prior to being driven into the web being bent slightly outwardly to cause the material of the under layer to compact between the prongs and the head and thereby spread the prongs intermediate the outer and inner faces of the web.

3. As an article of manufacture, a metallic fastener for fastening multiply web linings, web blocks and similar web articles to their supports, the fastener having a head, a shank and prongs, the said shank engaging the said support and extending integrally and centrally from the underside of the said head and the said prongs extending integrally from the marginal portion of the top of the said head in a direction opposite to that of the shank, the said prongs being slightly bent outwardly and being adapted to be driven into one face of the web article to compact the web material between the prongs and the head and thereby cause the prongs to spread intermediate the faces of the web article.

4. As an article of manufacture, a metallic fastener for fastening multiply web linings, web blocks and similar web articles to their supports, the fastener having a head, a shank and prongs, the said shank engaging the said support and extending integrally and centrally from the under side of the said head and the said prongs extending integrally from the marginal portion of the top of the said head in a direction opposite to that of the shank, the said prongs being slightly bent outwardly and the outer ends of the prongs being beveled from the inner face upward and outward to the outer face of the prongs, the under side of the said head being beveled and the said prongs being adapted to be driven into one face of the web article to compact the web material between the prongs and the head and thereby cause the prongs to spread intermediate the faces of the web article.

WILLIAM ACHTMEYER.